(12) United States Patent
de Boer et al.

(10) Patent No.: US 12,480,470 B2
(45) Date of Patent: Nov. 25, 2025

(54) METHOD OF OPERATING A WIND TURBINE, CORRESPONDING WIND TURBINE AND WIND FARM

(71) Applicant: Wobben Properties GmbH, Aurich (DE)

(72) Inventors: Wolfgang de Boer, Moormerland (DE); Enno von Aswege, Großefehn (DE); Ulf Schaper, Staffhorst (DE); Johannes Frommann, Hamburg (DE); Gnanasekaran Rengaraj, Tamil Nadu (IN)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/825,956

(22) Filed: May 26, 2022

(65) Prior Publication Data
US 2022/0397093 A1   Dec. 15, 2022

(30) Foreign Application Priority Data
Jun. 11, 2021   (EP) .................................... 21179051

(51) Int. Cl.
*F03D 7/02*   (2006.01)
*F03D 7/04*   (2006.01)
(Continued)

(52) U.S. Cl.
CPC .......... *F03D 7/0284* (2013.01); *F03D 7/048* (2013.01); *F03D 9/257* (2017.02); *H02J 3/381* (2013.01);
(Continued)

(58) Field of Classification Search
CPC .............. F03D 9/257; F05B 2270/1033; F05B 2270/335; F05B 2270/337; H02J 3/381
See application file for complete search history.

(56) References Cited

U.S. PATENT DOCUMENTS

| | | | |
|---|---|---|---|
| 4,420,692 A | 12/1983 | Kos et al. | |
| 10,063,060 B2 * | 8/2018 | Beekmann | ................ H02J 3/50 |

(Continued)

FOREIGN PATENT DOCUMENTS

| | | |
|---|---|---|
| CN | 109973299 B | 3/2020 |
| EP | 2840703 A2 | 2/2015 |

*Primary Examiner* — Tulsidas C Patel
*Assistant Examiner* — Thomas K Quigley
(74) *Attorney, Agent, or Firm* — Seed Intellectual Property Law Group LLP

(57) ABSTRACT

The present disclosure relates to a method of operating a wind turbine, a corresponding wind turbine, a method of controlling a wind farm and a corresponding wind farm. The method comprises the steps of: determining a target maximum active power to be fed by the wind turbine into a power grid, in particular into an electricity power grid; monitoring a current active power fed from the wind turbine into the power grid; determining a reference time period corresponding to the determined target maximum active power; deriving an average of the active power fed from the wind turbine into the power grid during the reference time period; comparing the average of the active power with the target maximum active power; and operating the wind turbine at a set operating point permitting active power above the target maximum active power in case the average of the active power is below the target maximum active power.

16 Claims, 8 Drawing Sheets

(51) Int. Cl.
*F03D 9/25* (2016.01)
*H02J 3/38* (2006.01)

(52) U.S. Cl.
CPC . *F05B 2220/706* (2013.01); *F05B 2270/1033* (2013.01); *F05B 2270/335* (2013.01); *F05B 2270/337* (2013.01)

(56) References Cited

U.S. PATENT DOCUMENTS

| | | | | |
|---|---|---|---|---|
| 2002/0079706 A1* | 6/2002 | Rebsdorf | ................ | H02P 9/007 290/55 |
| 2005/0012339 A1* | 1/2005 | Mikhail | .................... | H02P 9/04 290/44 |
| 2006/0132993 A1* | 6/2006 | Delmerico | ............. | F03D 7/048 361/20 |
| 2007/0057517 A1* | 3/2007 | McNerney | .............. | F03D 7/042 290/44 |
| 2008/0001411 A1* | 1/2008 | Ichinose | ............... | F03D 7/0272 290/55 |
| 2009/0212566 A1* | 8/2009 | Harms | .................... | F03D 7/028 290/55 |
| 2010/0148582 A1* | 6/2010 | Carter | .................. | H02J 7/1407 320/167 |
| 2010/0241280 A1* | 9/2010 | Garcia Barace | ........ | F03D 7/028 290/44 |
| 2010/0309692 A1* | 12/2010 | Chisenga | ................ | H02M 1/08 363/37 |
| 2012/0044014 A1* | 2/2012 | Stratakos | ............... | H03K 17/145 327/530 |
| 2014/0039811 A1* | 2/2014 | Bohlen | .................... | F03D 17/00 702/44 |
| 2015/0035282 A1* | 2/2015 | Garcia Sayes | ......... | F03D 7/042 290/44 |
| 2016/0333852 A1 | 11/2016 | Busker | | |

* cited by examiner

METHOD OF OPERATING A WIND TURBINE, CORRESPONDING WIND TURBINE AND WIND FARM

BACKGROUND

Technical Field

The present disclosure relates to a method of operating a wind turbine, a corresponding wind turbine and a wind farm.

Description of the Related Art

Common wind turbines use an aerodynamic rotor having a substantially horizontal axis of rotation and a plurality of rotor blades, usually three rotor blades. Each rotor blade has an adjustable pitch angle for adjusting an angle of attack between the rotor blade and the wind moving the rotor blade. Each pitch angle may be adjusted individually, but often all rotor blades are controlled uniformly using the same pitch angle for all rotor blades. Accordingly if a control of a wind turbine only considers one pitch angle, all rotor blades are controlled to the same pitch angle. The pitch angle can also be depicted as blade angle.

In a sub rated operation mode, the wind is not strong enough for the wind turbine to produce rated power. In such case the pitch angle of all rotor blades may be set to a constant value which is considered to be the optimum value. Depending on the wind speed, the wind turbine will operate with a varying rotor speed. A particular operating point may be characterized by a value of the generated power and a value of the rotor speed. Such operating point may be selected depending on a rotor speed versus a power characteristic curve. However instead of the generated power a generator torque may be considered according to a slightly different concept.

At and above rated wind speed, the wind turbine needs to be controlled to limit the rotor speed and the output power or the generator torque respectively in order to avoid damages to the wind turbine. A general concept is to pitch the rotor blades out of the wind along with increasing wind speed such that even with increasing wind speed the output power and rotor speed is kept fairly constant. In particular the wind turbine is controlled such that the wind turbine is operated with rated rotor speed and rated output power. Rated rotor speed and rated output power may also be referred to as nominal rotor speed or nominal output power respectively.

For long-term changes of the wind speed the pitch angle is adjusted to match the new wind speed such that the aerodynamic rotor is basically only extracting rated power. However in short-term variations of the wind speed, in particular in case of wind gusts, the output power can be kept constant by adjusting the generator torque based on the relationship between power P, generator torque M and rotor speed $\omega$ according to the formula $P=M*\omega$.

Accordingly, such wind gusts result in a change of the rotor speed $\omega$ and the generator torque M is adjusted accordingly such that the output power P is kept constant. The rotor speed can also be depicted by the symbol "n" in the unit of revolutions per minute [rpm].

Accordingly, a decrease in wind speed will result in a decrease of the rotor speed $\omega$ and that will result in an increase of the generator torque M. Such small variations in the rotor speed are acceptable as only short variations are expected. Therefore only short variations shall be compensated by such control of the generator torque M. However said increase of generator torque even further reduces the rotor speed and accordingly such (negative) wind gust may result in a significant decrease of the rotor speed. Of course, in case of a positive wind gust an increase of the rotor speed may result.

In particular a decrease of the wind speed can result in a situation, in which the wind turbine is not capable of complying with a desired power generation, i.e., in which it generates less electrical power than a specified power. The specified power can be a predefined nominal power of the wind turbine or a reduced power due to grid constraints, for instance. Thus, in particular in wind farms comprising a plurality of wind turbines an average power can deteriorate and thus result in a reduced annual power production of the wind turbine or wind park.

BRIEF SUMMARY

The present disclosure is directed to optimizing power production of wind turbine and wind park. Provided is an alternative method of operating the wind turbine and the wind park.

A method of operating a wind turbine is provided, the method comprising the steps of:
  determining a target maximum active power to be fed by the wind turbine into a power grid, in particular into an electricity power grid,
  monitoring a current active power fed from the wind turbine into the power grid
  determining a reference time period corresponding to the determined target maximum active power,
  deriving an average of the active power fed from the wind turbine into the power grid during the reference time period,
  comparing the average of the active power with the target maximum active power, and
  operating the wind turbine at a set operating point permitting active power above the target maximum active power in case the average of the active power is below the target maximum active power.

The presented method allows individual control of a wind turbine. Preferentially, the controlled or operated wind turbine is part of a wind farm comprising a plurality of wind turbines.

The presented method may partly or completely be implemented to be executed by a controller or processor, including a microprocessor, of the wind turbine. In further embodiments, some or all of the above described steps can be implemented on one or more controllers (or processors) remote from the wind turbine, for instance in a remote server connected via the Internet or in a central wind farm controller.

A target maximum active power can be communicated by a grid operator using grid code technology, for instance. However, also other options to determine the target maximum active power are contemplated. The target maximum active power can therefore also be referred to as a specified power, which can correspond to a default nominal power of the wind turbine or a reduced power, for instance.

With the help of the described method, power specifications can be adjusted over time averaging periods. In particular, the method makes it possible, after "negative gusts" during which the specified power could not be achieved due to insufficient wind speed, to achieve the targeted average active power again by subsequently applying additional power within the averaging period.

In particular, this allows a more precise adjustment of the maximum power specifications of grid operators, energy marketers, authorities, as well as the adjustment of the nominal power of the plant or the maximum power of an operating mode.

Compared to a plant control without such a procedure, the yield of a plant is normally improved. The method can be parameterized site-specifically and enables a site-specific optimization between load increases and additional yield.

To this end, the wind turbine may be operated above the target maximum active power in case the average of the active power for the reference time period is below the target maximum active power. In such cases, the wind turbine can generate a power value above its default nominal power. To generate the additional power, the operating point is adjusted.

The operating point may simply be indicated as a set power value, wherein a control unit of the wind turbine adjusts the operating parameters of the wind turbine accordingly. In other examples, the operating point of the wind turbine can include a combination of operating parameters of the wind turbine, for instance of at least one of rotor speed, pitch angle and generator torque.

The operating point thus set may include an operation of the wind turbine which would not be permanently possible without damage to the wind turbine, i.e., an operating point at which the wind turbine may only be operated for a certain amount of time. For instance, the operation may produce excess heat that would result in critical heat buildup after the certain amount of time.

This potentially critical "long-term" operation may be accepted in the context of the present invention, since the aim of the present invention is that the average of the active power gets as close as possible to the target maximum active power, to which end the operation above target maximum active power is only necessary for a certain limited amount of time, i.e., not permanently.

Preferably, the active power can be determined by measuring an active power output of the generator of the individual wind turbine, for instance measured on a low-voltage side at a transformer input. In other examples, an air gap power of the generator, which approximately corresponds to the generator output power, can be measured and optionally corrected.

Finally, in other examples the active power can be determined on a wind farm level, wherein an active power of a plurality of wind turbines is determined collectively. For instance, a power at the point of common coupling of the wind farm can be measured.

In a preferred embodiment, the target maximum active power is determined under consideration of at least one of, preferentially more than one of and in particular all of:
- a limitation specification from a grid operator or an energy marketer,
- a curtailment specification from operational control such as a temperature management of thermally inert generator components,
- an official requirement,
- a nominal output of the wind turbine,
- a maximum active power of the wind turbine in a specific operating mode.

The limitation specification from the grid operator or energy marketer are also known as grid connection guidelines or grid codes.

Official requirements can include laws or ordinances on feed-in tariffs such as a graduation level of the feed-in tariffs depending on the connected load. In such examples, it may from an economical point of view be beneficial, to optimize the generated average power such that the feed-in tariffs are maximized.

Other examples of requirements can include operating permits which include a noise reduced operation, for instance a reduction to a certain power of, e.g., 3000 kW (kilowatts) during a predetermined time, such as between 10 p.m. and 6 a.m.

With regard to noise reduced or noise restricted operation, it is preferred that the generated noise be considered in addition to the generated active power, even though the operating permit would only define a maximum power. To this end, it has proven efficient to adjust the reference time period to correspond to an averaging period for the noise determination, which may for instance be less than 5 minutes, for instance between 30 s (seconds) and 60 s.

In a preferred embodiment, the reference time period is determined as the time period during which an average of the active power shall should not exceed the target maximum active power.

Since the average of the active power for this reference time period is compared with the target maximum active power, and since the active power is only increased above the target maximum active power in case the average is determined to be below the target maximum active power, the average of the active power may only exceed the target maximum active power for a period which is shorter than the reference time period.

In a preferred embodiment, the reference time period is a period of predetermined length up to the current time, wherein the predetermined length is in particular between 1 second and 20 minutes and preferably about or exactly 10 minutes.

In this embodiment, the reference time period is a moving time period, wherein the starting point of the reference time period is always at a fixed distance between A reference time period of 10 minutes has been broadly considered in the past for the grid connection point. It is contemplated that the duration of the reference time period will become shorter in the future, for instance in the region of 30 seconds to 2 minutes, preferably 1 minute.

In other embodiments, the reference time periods are fixed time periods such as fixed billing periods. Such fixed time periods can have a defined duration, for instance between 1 minute and 1 hour and preferably exactly or about 15 minutes, and a fixed starting point, for instance on the hour, or every quarter of the hour, etc.

The reference time period can be a static time period, which is for instance predefined, or can be dynamically changed, for instance by the grid operator. In most practical implementations, the duration of the reference time period will be constant and not or only rarely change over time.

In a preferred embodiment, the average of the active power is determined as a moving average of the monitored current active power of the wind turbine.

The average can for instance be an arithmetic or geometric or weighted average. Alternative ways to determine the average are also contemplated.

In a preferred embodiment, a deviation of the average of the active power from the target maximum active power is referred to as an average power deviation and a deviation of the active power according to the operated operating point from the target maximum active power is referred to a target active power deviation, the method further comprising, in the step of operating:
  setting the target active power deviation as a function of the average power deviation.

In this embodiment, the functional dependency of the target active power deviation from the average power deviation allows that, for instance, a higher value of the average power deviation results in a proportionally higher active power according to the operated operating point. Expressed in other words, the functional relationship can allow that an adequate compensation for the average power deviation can be achieved.

In a preferred embodiment, the method comprises in the step of setting the target active power deviation:
  setting the target active power deviation linearly proportional to the average power deviation.

Thus, an average power deviation of, for instance, 2% of the target active power deviation can result in a target active power deviation of 2%, i.e., a proportionality factor of one, or 4%, i.e., a proportionality factor of two, above the target active power. Of course, also other linear proportionality factors or other functional relationships, such as exponential, logarithmic or polynomial functional relationships are contemplated.

In a preferred embodiment, the method further comprises:
  determining a proportionality factor between the active power deviation and the average power deviation under consideration of at least one environmental factor of a construction site of the wind turbine.

In this embodiment, the compensation of the average power deviation from the target active power can be adapted to the actual environment of the wind turbine.

The environmental factor can include one or more of substantially static, such as an air density level or wind class, or a dynamic environmental factors, such as a presently measured wind speed or turbulence intensity, just to name some.

For example, the proportionality factor may be lower in case an increased turbulence intensity can be determined in order to limit the additional loads acting on the wind turbine. To the contrary, calm winds with a lower turbulence intensity may allow a higher proportionality factor. Other applications are contemplated.

In a preferred embodiment, a predefined maximum target active power deviation limits the amount of the positive active power deviation.

In this embodiment, even if the average power deviation becomes large, i.e., the average power is significantly below the target power, the operating point will be set to limit the active power to a maximum amount.

In a preferred embodiment, the method comprises:
  operating the wind turbine at an operating point ensuring active power below the target maximum active power in case the average of the active power is above the target maximum active power.

In a preferred embodiment, a predefined proportionality factor for negative average power deviation is larger than a predefined proportionality factor for positive average power deviation.

The compensation of the average power deviation, i.e., the speed with which the average power approaches the target maximum active power, is thus higher for a negative average power deviation. Thus, a lack of available wind energy, i.e., a low wind speed, in a certain period can be compensated in a shorter period with surplus of available wind energy.

In a preferred embodiment, a set active power of the set operating point is determined according to a power boost factor, the set active power being determined as a product of the target maximum active power and the power boost factor.

The difference between the set active power and the target maximum active power, i.e., the target active power deviation, may be referred to as a "power boost." Relative to the target maximum active power, a power boost factor can be obtained.

The maximum target active power deviation may be expressed as a maximum power boost factor, for instance, to a certain factor of the target maximum active power.

In one embodiment, the power boost factor may be limited to 110% of the target maximum active power, while also other values are of course contemplated.

In a preferred embodiment, the power boost factor is at least one of
  a) increased in case the average of the active power is above the target maximum active power, and
  b) decreased in case the average of the active power is below the target maximum active power.

Accordingly, the set active power is adjusted according to the power boost factor, which is therefore between 0, which would correspond to 0 kW of set active power, and the maximum power boost factor. Preferentially, the power boost factor is thus in the range of 0.9 to 1.2, more preferably of between 0.9 and 1.1.

In a preferred embodiment, the method further comprises:
  determining a maximum of the power boost factor proportionally to a deviation of the average of the active power from the target maximum active power.

For instance, the power boost factor is limited to be at most twice the deviation of the average from the target maximum active power such that if the deviation is equal to 1% of the average of the active power, the power boost factor is at most 2% above the target maximum active power. In other examples, of course other proportionality factors are envisaged.

In a preferred embodiment, the method further comprises
  limiting a change rate of the power boost factor such that oscillations in wind turbine control are avoided.

Oscillations can lead to increased loads and high control input necessary and are therefore undesired. Since the change rate of the power boost factor, for instance expressed as a temporal derivative of the power boost factor, is limited, i.e., does not exceed a predefined maximum change rate, oscillations are less likely to occur.

For instance, the maximum change rate can be expressed relative to the target maximum active power and/or be an absolute power or certain percentage of the target maximum active power per time unit, for instance per second.

In one example, the maximum change rate of the power boost factor can result in a power change of not more than 10 kW/s, which will reliably avoid the occurrence of oscillations.

In a preferred embodiment, the method further comprises
  estimating whether the set operating point will result in a decrease of generated active power by anticipating future power drops, and
  reducing the power boost factor in case the result of the estimating step is positive.

In this embodiment, future power drops may be anticipated, in which the operation using a large power boost factor is counterproductive. In case the present wind decreased such that an operation at the intended power level, for instance, is not possible, the wind turbine may be operated in the so-called partial load area, in which the rotor speed of the wind turbine is kept constant by reducing, for instance, a generator torque in addition or in alternative to controlling a pitch angle of the wind turbine.

In particular under this circumstance, i.e., in case the wind declined to an extent that the partial load operation is unavoidable, it may therefore be beneficial to reduce the power boost factor to reduce or avoid the effect of the method according to the present invention on the rotor speed control of the wind turbine.

In a preferred embodiment, the wind turbine includes a rotor comprising at least one rotor blade which is adjustable in its blade angle, and the method comprises
estimating that the set operating point will result in a decrease of generated active power in case the increased power generation will reduce the a rotor speed of the rotor, in particular in case a blade angle of at least one of the rotor blades approaches a set minimum pitch angle.

In this context, the set minimum pitch angle is a lower border or limit of the range of pitch angles, which may be set by the rotor speed controller of the wind turbine. Upon approaching this minimum pitch angle, one way of reaction by the rotor speed controller, i.e., the further reduction of pitch angle, will not be available anymore and the rotor speed of the wind turbine is about to decline, of course assuming constant or further decreasing wind speed. The blade pitch angle approaching the set minimum pitch angle, e.g., the difference between the blade angle and the set minimum pitch angle drops below a certain threshold of, for instance, 0.5 degrees or 2 degrees, may be considered one example to anticipate future power drops, while also other forms are contemplated.

It is advisable in this situation to slowly reduce generator power in order to keep the rotor speed from decreasing. The decreasing rotor speed would result in an even less efficient operation and thus in even less generated active power.

In a preferred embodiment, the wind turbine includes a rotor comprising at least one rotor blade which is adjustable in its blade angle, the step of operating the wind turbine at a set operating point permitting active power above the target maximum active power comprising
determining the current blade angle of at least one of the rotor blades,
determining a minimum blade angle as a minimum value of the blade angle, and
operating the wind turbine at the set operating point only if the current blade angle exceeds the limit angle plus a predefined difference limit angle.

The current blade angle can be determined as the current blade angle of only one of the rotor blades or as a common value, such as a minimum value of average value, of all rotor blades, if appropriate.

The minimum blade angle can be provided, for instance, by the rotor speed controller of the wind turbine or a different unit, and represents the lower limit of the range of adjustable blade pitch angles.

The predefined difference limit angle can be regarded a safety margin above the determined minimum blade angle with ensures a stable operation of the wind turbine even if environmental conditions such as wind conditions change.

In case of wind gusts quick changes of the wind speed occur and to simplify the explanations it is assumed, unless explained differently, that during such short deviations of the wind no pitching of the rotor blades will take place. Accordingly it is assumed for the following explanations that the pitch angle for all rotor blades is constant.

A typically used control concept is to keep the power constant during such wind gusts. In case of a positive wind gust the rotor speed n will increase and the wind turbine is controlled such that the power is kept constant. The same applies if there is a negative wind gust resulting in a drop of wind speed. In that case the rotor speed n will drop but the power is still kept constant by the control of the wind turbine. It is to be mentioned that even though the rotor speed falls during such negative wind gust to values below rated rotor speed $n_N$, the wind speed is still above nominal wind speed and accordingly the power will not drop. In other words even though the rotor speed falls below the rated rotor speed $n_N$ the operation is not necessarily changing back to a sub-rated operation.

However if the rotor speed increases and the power is kept constant, the generator torque will fall. If the rotor speed drops below rated rotor speed $n_N$ while the power is kept constant, the corresponding generator torque will raise.

Such dropping or raising of the generator torque causes loads to the wind turbine and is to be reduced and accordingly a constant torque power curve is suggested. Accordingly in case of a positive wind gust resulting in an increasing rotor speed n, the power may be controlled to raise as well having the effect that the resulting generator torque is kept constant. The same constant torque power curve may thus be used for falling rotor speeds in particular due to negative wind gusts. Accordingly at falling rotor speed n the power shall also fall according to the constant torque power curve. This also results in keeping the generator torque constant.

In a preferred embodiment, the method further comprises that:
an increase in power above the maximum power is limited as a function of a difference between the current blade angle and the sum of the limit angle and the predefined difference angle, in particular is limited proportionally to the difference or as a function of a predetermined characteristic curve.

In this embodiment, excessive increase of the power which might not be permissible or risky for the rotor speed or blade pitch angle controller can be avoided since the power increase is limited. Thus, a reliable and secure operation of the control of the wind turbine can be ensured. The predetermined characteristic curve can for instance indicate a limit of an excess active power above the target maximum active power as a function of a blade angle reserve, i.e., the difference between the current blade angle and the sum of the limit angle and the predefined difference angle.

In a preferred embodiment the operation of the wind turbine at the set point is avoided in case at least one of
the average power being below the target maximum average is due to an intervention of a blade load limiter,
an intervention by a storm control operation, and
a noise optimization operation.

Interference of the method of operating the wind turbine according to the present invention with other safety features of the wind turbine, which might for instance lead to both methods acting against each other, deteriorating effects of the respective other method or even result in unreliable operation of the wind turbine, may therefore be avoided.

For instance, such further operating modes can comprise the blade load limitation, which may increase or decrease any of the operating parameters of the wind turbine to avoid excess loads on the blades. Further, a storm control operation can reduce or stop the operation of the wind turbine in case of high wind speeds to avoid potential damage on any component of the wind turbine. Next, a noise optimization operation avoids excessive noise, which may be deteriorated in case the wind turbine is operated with an increased power set point.

In a further aspect, a method for controlling a wind farm, the wind farm comprising a plurality of wind turbines, is provided. The method comprises the steps of:

determining a combined target maximum active power to be fed by the plurality of wind turbines into a power grid, in particular into an electricity power grid, monitoring a combined current active power fed from the plurality of wind turbines into the power grid determining a reference time period corresponding to the determined combined target maximum active power, deriving an average of the combined active power fed from the plurality of wind turbines into the power grid during the reference time period, comparing the average of the combined active power with the combined target maximum active power, and operating at least one of the wind turbines at a set operating point permitting an active power such that the combined active power is above the combined target maximum active power of the plurality of wind turbines in case the average of the combined active power is below the combined target maximum active power.

The method of controlling a wind farm allows to obtain on a wind farm level the same advantages as described in detail with regard to the method of operating a wind turbine according to the present disclosure. In effect, the method according to this aspect results in an increased energy production which is as close as possible to the target maximum active power of the wind farm.

The method according to this aspect can be combined with all preferred embodiments of the method of operating a wind turbine according to the present disclosure and can at the same time achieve the same benefits.

According to a further aspect, a wind turbine is presented comprising a controller adapted to control the wind turbine according to a method according to an aspect or a preferred embodiment of the present disclosure.

The wind turbine according to this aspect allows to obtain the same advantages as described in detail with regard to the method of operating a wind turbine according to the present disclosure. In effect, the wind turbine according to this aspect results in an increased energy production which is as close as possible to the target maximum active power.

Further, the wind turbine according to this aspect can be combined with all preferred embodiments of the method of operating a wind turbine according to the present disclosure and can at the same time achieve the same benefits.

In a further aspect, a wind farm controller adapted to control the wind farm according to a method according to the present disclosure is presented.

The wind farm controller allows to obtain on a wind farm level the same advantages as described in detail with regard to the method of operating a wind turbine according to the present disclosure. In effect, the wind farm controller according to this aspect results in an increased energy production which is as close as possible to the target maximum active power of the wind farm.

The wind farm controller according to this aspect can be combined with all preferred embodiments according to the present disclosure and can at the same time achieve the same benefits.

Also provided is a wind farm having a plurality of wind turbines according to any of the above mentioned aspects of wind turbines. Such wind farm may have a point of common coupling used by all wind turbines in order to feed the produced power into the electrical supply grid. It was found that the proposed method and the proposed wind turbines may result in fluctuating output power due to wind gusts. However such wind gusts do not reach all wind turbines in a wind farm exactly at the same time and accordingly the power fluctuations also vary at least by a time from one wind turbine in the wind farm to another. Accordingly the wind farm is levelling out such fluctuations and accordingly power fluctuations due to the suggested control method are less relevant for the electrical supply grid if the method is used for a plurality of wind turbines within a wind farm.

BRIEF DESCRIPTION OF THE SEVERAL VIEWS OF THE DRAWINGS

Below the invention is explained by a way of examples using embodiments based on the attached figures.

DETAILED DESCRIPTION

Figure 1:
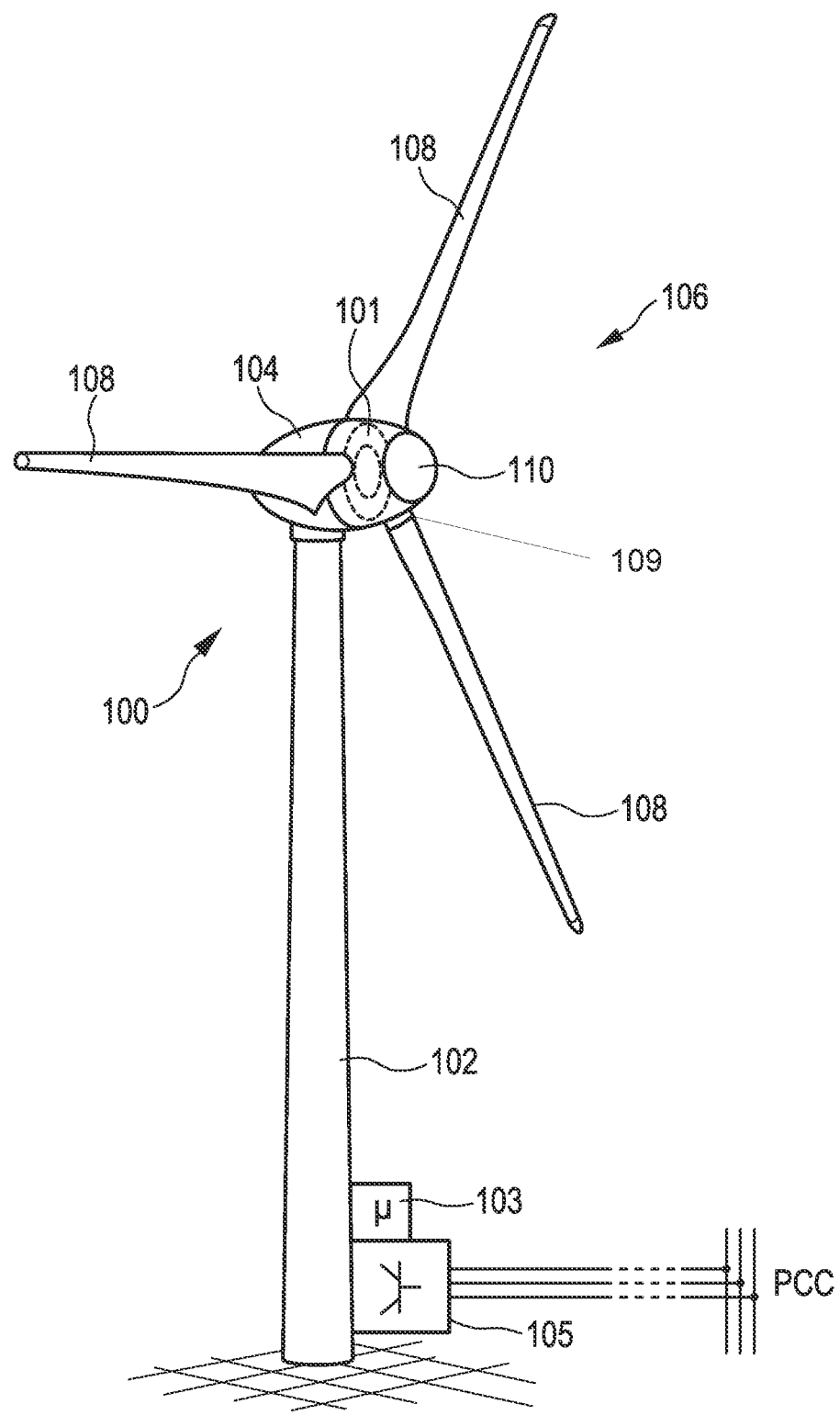
FIG. 1 shows a wind turbine in a perspective view.

FIG. 1 shows a schematic illustration of a wind power installation according to the invention.

The wind power installation 100 comprises a tower 102 and a nacelle 104 on the tower 102. An aerodynamic rotor 106 comprising three rotor blades 108 and a spinner 110 is provided on the nacelle 104. The aerodynamic rotor 106 is caused to effect a rotational movement by the wind during operation of the wind power installation and thereby also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

The wind power installation 100 comprises an electrical generator 101, indicated in the nacelle 104. Electrical power can be generated by means of the generator 101. An infeed unit 105, which can be configured as an inverter, in particular, is provided for feeding in electrical power. It is thus possible to generate a three-phase infeed current and/or a three-phase infeed voltage according to amplitude, frequency and phase, for infeed at a network connection point PCC. That can be effected directly or else jointly with further wind power installations in a wind farm. An installation controller 103 is provided for controlling the wind power installation 100 and also the infeed unit 105. The installation controller 103 can also acquire predefined values from an external source, in particular from a central farm computer.

Figure 2:
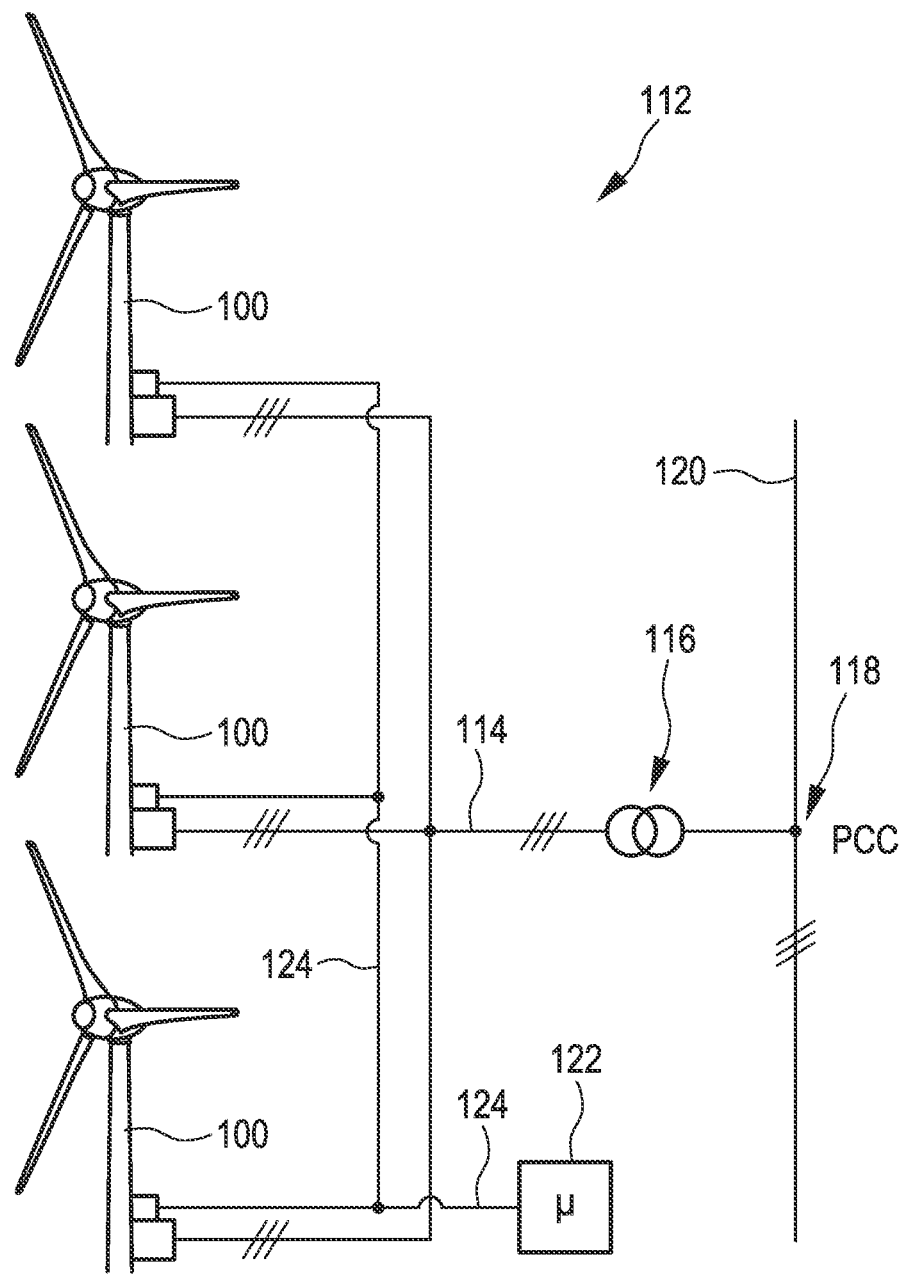
FIG. 2 shows a wind farm in a schematically view.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a wind farm 112. Moreover, by way of example, the farm network 114 can be configured differently, with for example a transformer also being present at the output of each wind power installation 100, to mention just one different exemplary embodiment.

The wind farm 112 additionally comprises a central farm computer 122. The latter can be connected to the wind power installations 100 via data lines 124, or in a wireless manner, in order thereby to exchange data with the wind power installations and in particular to acquire measured values from the wind power installations 100 and to transmit control values to the wind power installations 100.

In one example, the method according to the present disclosure can be expressed to comprising the following steps:

(1) Determination of a target power (active power) to be aimed at. Possible sources for this are, for example: control specifications from the grid operator or energy marketer, control specifications from operational management (e.g., generator temperature management of thermally inert components), official requirements, design parameters (nominal power of a plant, maximum power of an operating mode).

(2) Determination of an averaging period to which the target power from step (1) refers. A typical specification are 10 min averages, while also other periods are contemplated.

(3) Measurement, in particular continuous measurement of the injected active power, and storage of the resulting time history.

(4) Calculation of a moving average based on the stored time history on (3) over the selected period from (2).

(5) Calculation of a power increase factor (boost factor), which indicates the measure of temporary power increase to be aimed at. For this purpose, the mean actual power known from step (4) is preferentially compared with the target power known from step (1). If the mean actual power is below the target power, a power increase factor, which is also referred to as power boost factor, is raised. If the actual power is above the target power, the power increase factor is lowered (this case occurs especially when the target power is changed).

How far the power increase factor can be raised (or lowered) preferentially depends on how much the average power falls below (or exceeds) the target power.

A proportional coupling is particularly suitable here (e.g., the power increase factor is increased up to 102% if the target power was undercut by 1%, and increased to 104% if the target power was undercut by 2%, etc.).

The rate of change of the power increase factor is preferentially chosen sufficiently low to avoid oscillations in the resulting control loop (e.g., 10 kW/s).

The power increase factor is preferentially limited to an adjustable range (e.g., to compensate for previous underpower situations, subsequently feed in a maximum of 110% of the target power).

The power increase factor is preferentially reduced when an operating state is reached in which increased power consumption resulted in a subsequent power drop. This happens in particular when it becomes apparent that the wind speed drops to such an extent that the target rotor speed could no longer be maintained with an increased power input (i.e., coming out of speed control operation with high wind speeds, the blade angles advance to a minimum blade angle).

(6) The maximum power that would otherwise be set and the associated power setpoint are adjusted (typically increased by a few percent) via the power increase factor. The increased power is fed in.

In particular, the upper limit for the power increase factor (e.g., maximum 110%) and the proportional coupling factor between target power undershoot power increase factor limit are useful parameters for site-specific parameterization.

The method according to the present disclosure is beneficial in the dynamic determination of the maximum power of a wind turbine. An application on wind farm level is also conceivable in some embodiments.

This will be illustrated by the example of a 10 min time series with a wind turbine, which can generate technically 5500 kW power. In the time series, the technically generated power fluctuates between 1900 kW (during a negative gust) and 5500 kW (technical limitation of the WEA).

An exemplary target power of 4000 kW (e.g., network operator specification) leads according to the classic procedure to a limitation of the power setpoint to 4000 kW. This results (due to gusts/turbulence) in that the average power within exemplary 10 min time interval results below the aimed power set point.

Figure 3:
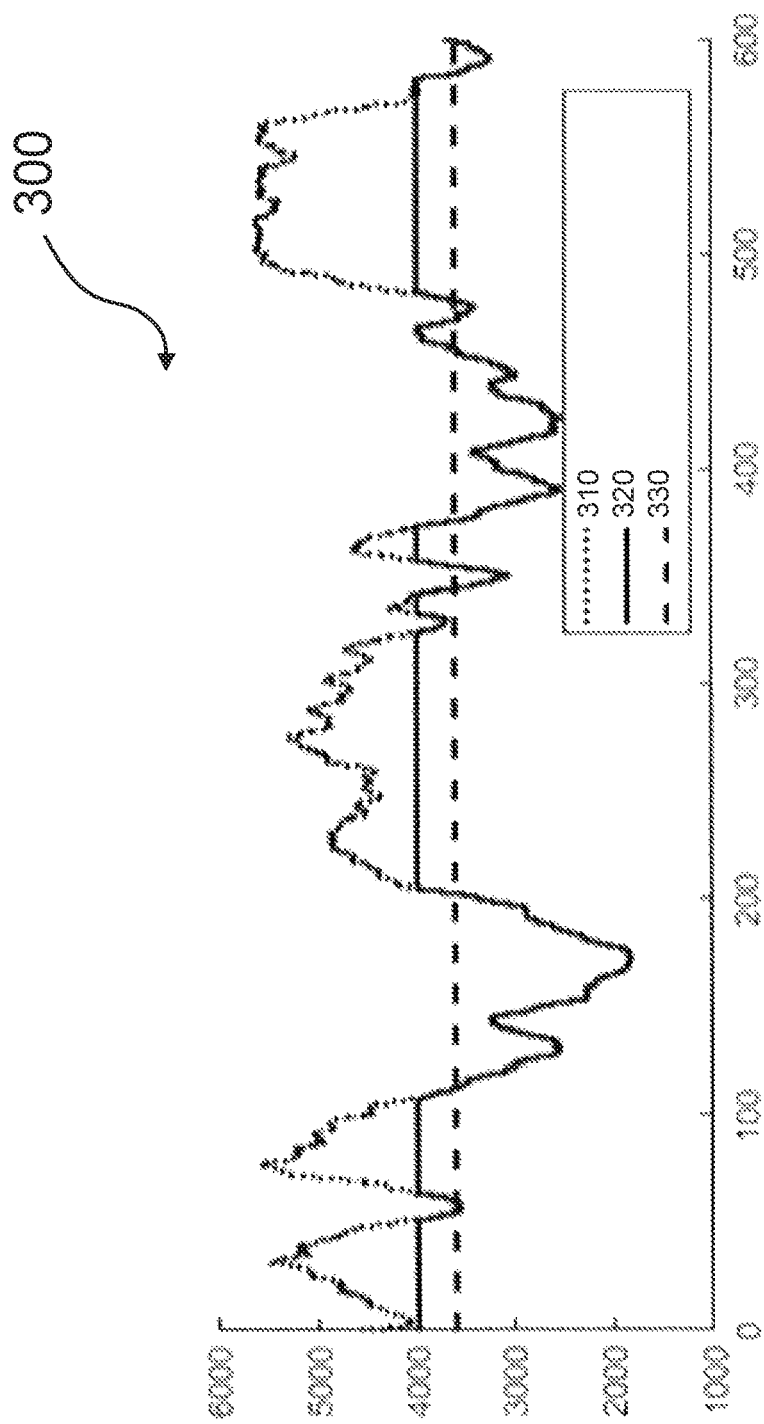
FIG. 3 shows a diagram illustrating power over time.

FIG. 3 illustrates a situation 300 before introducing the "Temporary Power Boost" according to the present invention, wherein every maximum power was understood as an immediate and short-term limit. On a vertical axis, generated power is drawn. The unit is arbitrary and may, for instance, be in kW. On a horizontal axis, a time is drawn. The unit is also arbitrary and may, for instance, be in seconds (s).

A first dashed line 310 illustrates the technically available power, which fluctuates between approx. 1900 kW and 5500 kW. Using a limitation of the power setpoint to 4000 kW results in a line 320 indicating the generated power. In this example, an average value 330 of the generated power reaches only 3604 kW, i.e., well below the target power of 4000 kW, for instance.

Figure 4:
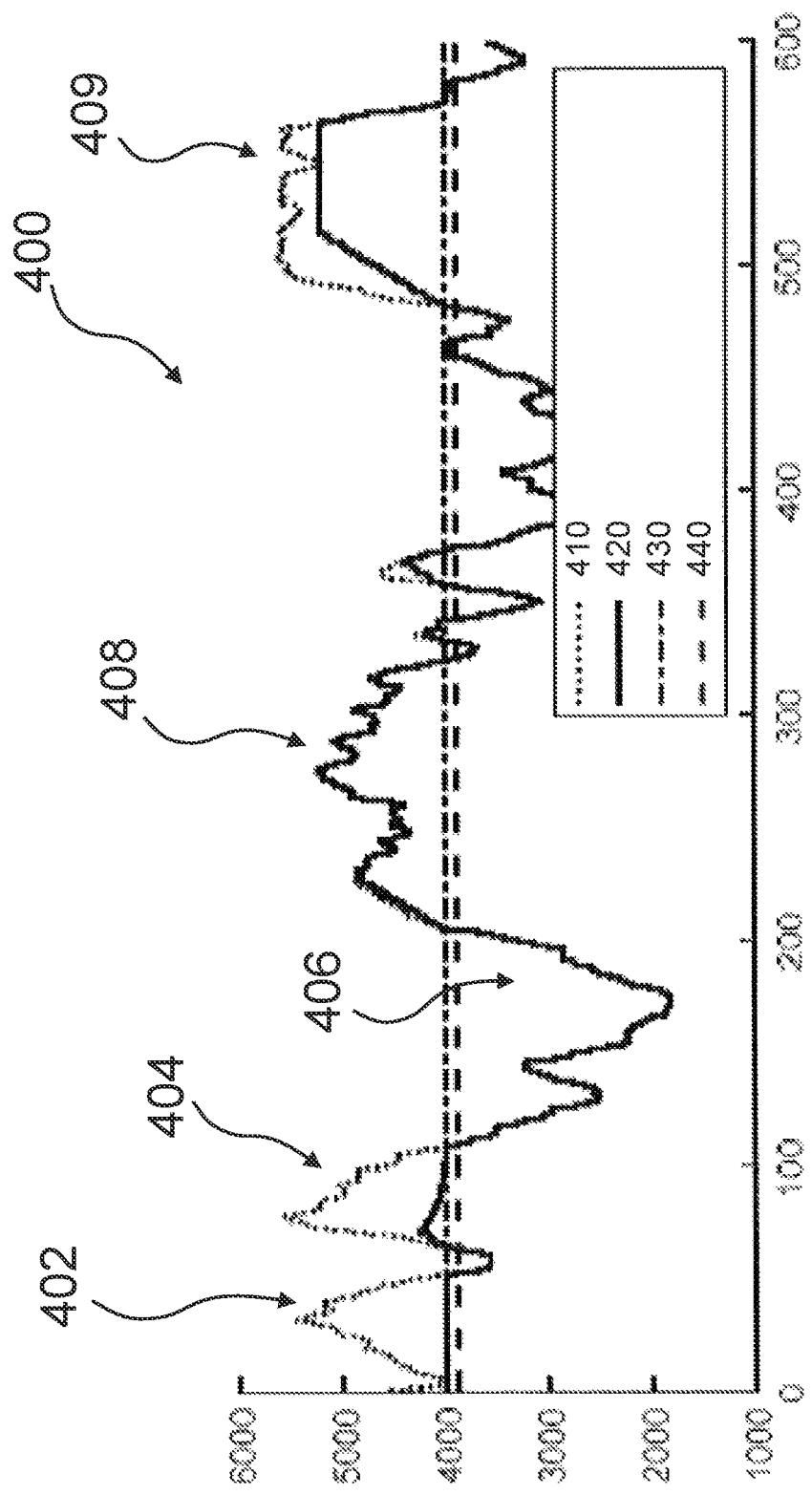
FIG. 4 shows a diagram illustrating modified power over time.

FIG. 4 illustrates a situation 400 after introducing the "Temporary Power Boost" in a drawing similar to FIG. 3. Again, a first dashed line 410 illustrates the technically available power and a solid line 420 indicates the generated power. The target average value is indicated with a second dashed line 430 and the average value 440 of the generated power can be seen to be closed to the target power than in the example of FIG. 3.

In a first time period 402, the generated power corresponds to the target power set point, for instance, of 4000 kW. After a short reduction of power production, for instance due to a negative gust, the generated power is increased during a second time period 404 to compensate for the prior drop in power production. The generated power during this period is below the technically available power so that the target average power but not more than the target average power is generated.

After a longer period 406 of low generated power, for instance of low wind speed, during a period 408 the generated power lies well above the target average power.

In a period 409, a limit for the increased generated power above the target power can be seen as the generated power 430 proceeds horizontally. The upper limit for the power boost, i.e., the increase of the generated power above the target power, may be for instance 130% of the target power.

Figure 5:
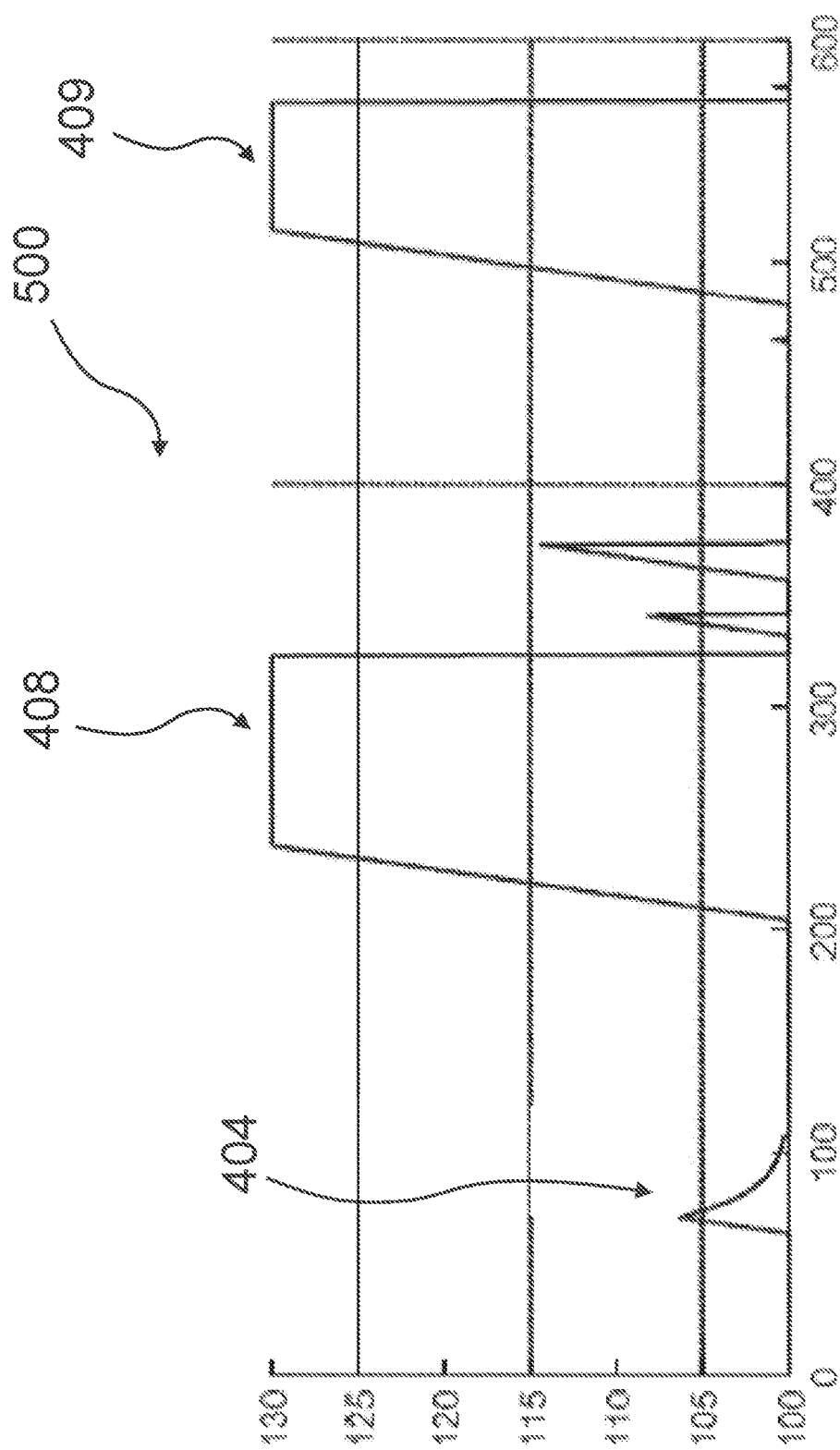
FIG. 5 illustrates a power increase factor for the time period of FIG. 4.

FIG. 5 schematically and exemplarily illustrates the corresponding power increment factor, referred to as power boost factor, in a diagram 500 for the same time period as illustrated in FIG. 4. In this example, the power boost factor can be between 100% and 130% of the target active power.

Figure 6:
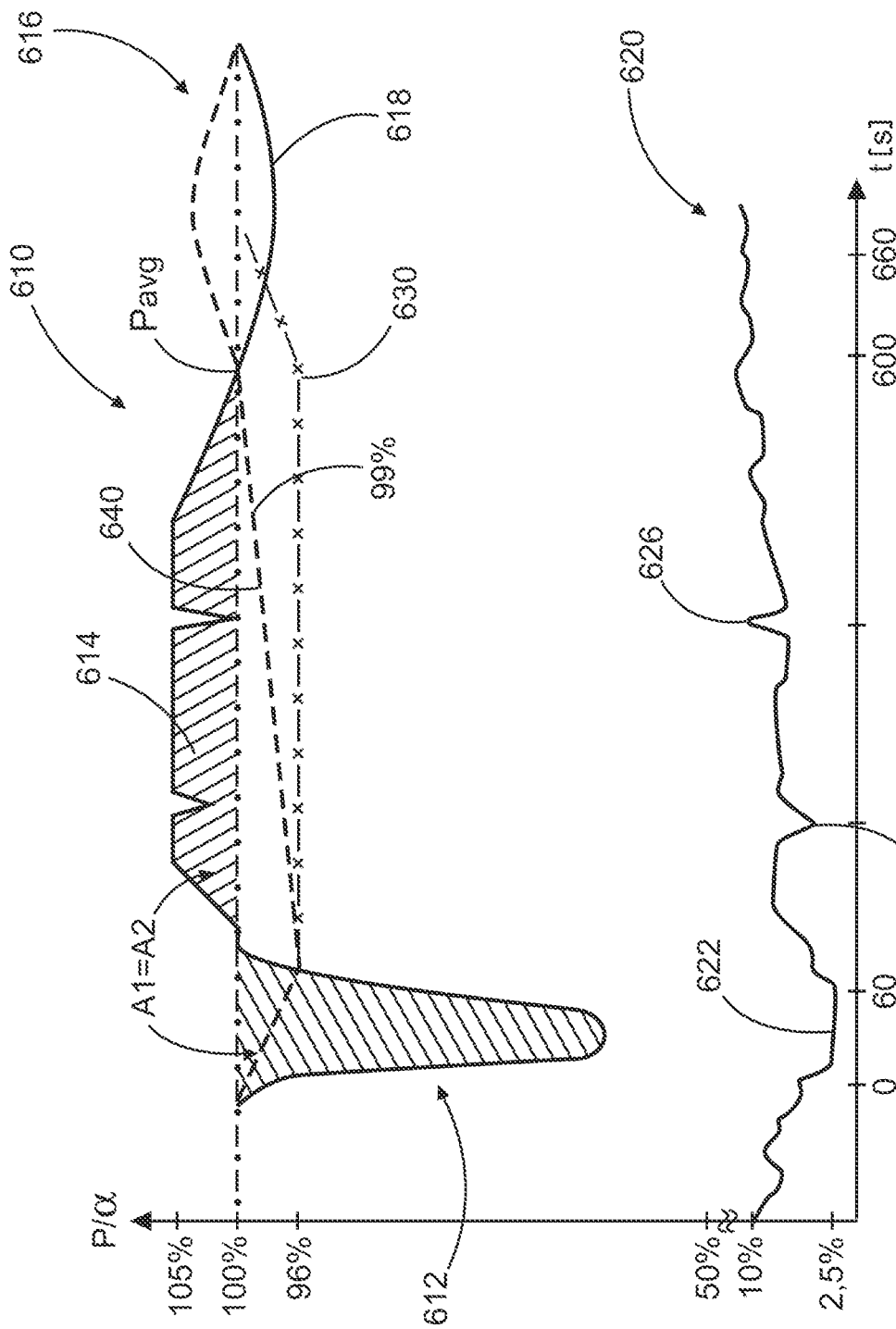
FIG. 6 shows two diagrams explaining the operation of a maximum power control.

FIG. 6 schematically and exemplarily illustrates a further example graph 610 of generated power over time and a graph 620 of a corresponding pitch angle of the rotor blades of the wind turbine for the same time period.

A lack of generated power during period 612 is indicated with the surface area below target power under the curve A1. The surface area corresponds to a surface area A2 during a period 614, in which more than target power is generated. This period 614 can be referred to as a power boost period.

An average generated power 630 corresponds to the generated power without power boost and a generated power 640 includes the power boost. It can be seen that the generated power 640 approximates the target power, while the generated power 630 remains at approximately 95% due to the lack of generated power during the period 612.

After compensating the lack of generated power, i.e., $P_{avg}$ equals the desired target power, potential excess power would be available during a period 616. In this period 616, the generated power 618 may be reduced so that an average generated power, for instance a moving average over the preceding 10 minutes, does not exceed the target power.

The set value of the blade pitch angle is indicated in graph 620. During periods of negative gusts or low wind, a minimum blade angle 622 is set. This angle is also referred to as $\alpha_{min}$. More available wind will result in an increased pitch angle to limit the generated power to the desired power value. At point in time 624, the wind dropped to nominal wind, for instance, such that the pitch angle is reduced. At point in time 626, the blade angle might be increased in order, for instance, to limit oscillations or load on the wind turbine.

Figure 7:
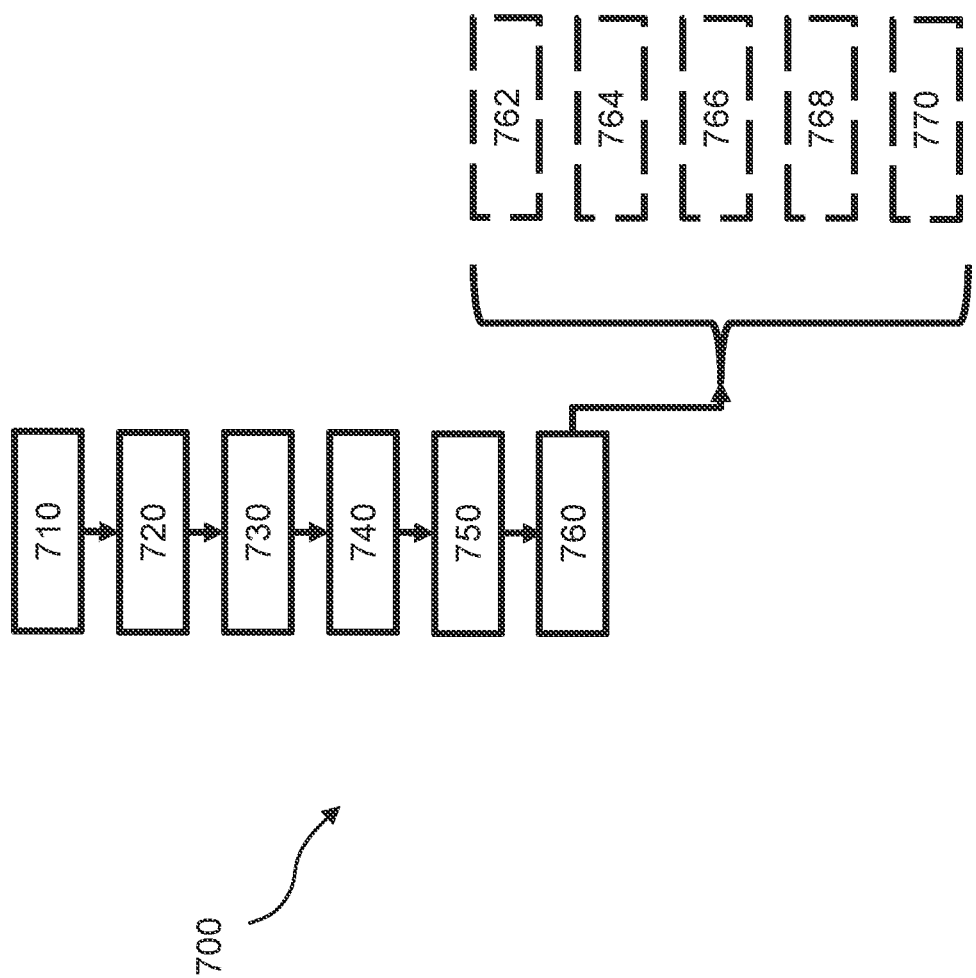
FIG. 7 schematically and exemplarily illustrates a flow-chart of a method.

FIG. 7 schematically and exemplarily illustrates a flow-chart of a method 700 of operating a wind turbine 100. The method 700 comprises the steps 710 to 760 and optionally at least one of the optional steps 762 to 770 described in the following.

A step 710 of determining a target maximum active power to be fed by the wind turbine 100 into a supply network 120 such as a power grid, in particular into an electricity power grid. The target maximum active power is in particular determined under consideration of at least one of, preferentially more than one of and in particular all of: a limitation specification from a grid operator or an energy marketer, a curtailment specification from operational control such as a temperature management of thermally inert generator components, an official requirement, a nominal output of the wind turbine, and a maximum active power of the wind turbine 100 in a specific operating mode.

A step 720 of monitoring a current active power fed from the wind turbine 100 into the power grid 120, for instance at an input of a transformer of the wind turbine 100.

A step 730 of determining a reference time period corresponding to the determined target maximum active power. The reference time period is in particular determined as the time period during which an average of the active power shall should not exceed the target maximum active power. The reference time period is in particular a period of predetermined length up to the current time, wherein the predetermined length is in particular between 1 second and 20 minutes and preferably about or exactly 10 minutes.

A step 740 of deriving an average of the active power fed from the wind turbine into the power grid 120 during the reference time period. The average of the active power may be determined as a moving average of the monitored current active power of the wind turbine.

A step 750 of comparing the average of the active power with the target maximum active power.

A step 760 of operating the wind turbine at a set operating point permitting active power above the target maximum active power in case the average of the active power is below the target maximum active power.

A deviation of the average of the active power from the target maximum active power may be referred to as an average power deviation and a deviation of the active power according to the operated operating point from the target maximum active power is referred to a target active power deviation. The step 760 of operating may optionally include a step 762 of setting the target active power deviation as a function of, in particular linearly proportional to, the average power deviation.

Further, the step 760 may include an optional step 764 of determining a proportionality factor between the active power deviation and the average power deviation under consideration of at least one environmental factor of a construction site of the wind turbine 100.

If the wind turbine 100 includes a rotor 106 comprising at least one rotor blade 108 which is adjustable in its blade angle, the step 760 may further comprise:

A step 766 of determining the current blade angle of at least one of the rotor blades.

A step 768 of determining a minimum blade angle as a minimum value of the operable blade angle range, and A step 770 of operating the wind turbine at the set operating point only if the current blade angle exceeds the minimum angle plus a predefined difference limit angle.

Figure 8:
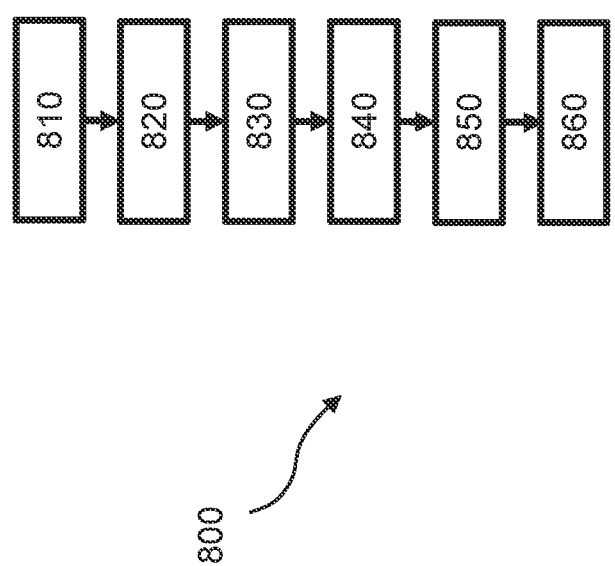
FIG. 8 schematically and exemplarily illustrates a flow-chart of a method.

FIG. 8 schematically and exemplarily illustrates a flow-chart of a method 800 for controlling a wind farm 112, for instance using a central farm computer 122. The wind farm 112 comprises a plurality of wind turbines 100, and the method 800 comprises steps 810 to 860 described in the following.

A step of determining 810 a combined target maximum active power to be fed by the plurality of wind turbines 100 into a power grid 120, in particular into an electricity power grid.

A step of monitoring 820 a combined current active power fed from the plurality of wind turbines 100 into the power grid 120, A step of determining 830 a reference time period corresponding to the determined combined target maximum active power, A step of deriving 840 an average of the combined active power fed from the plurality of wind turbines 100 into the power grid 120 during the reference time period, A step of comparing 850 the average of the combined active power with the combined target maximum active power, and A step of operating 860 at least one of the wind turbines 100 at a set operating point permitting an active power such that the combined active power is above the combined target maximum active power of the plurality of wind turbines 100 in case the average of the combined active power is below the combined target maximum active power.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wind turbine, the method comprising:
   providing an active power output from the wind turbine to an electric grid,
   monitoring the active power output,
   determining a reference active power output,
   determining a reference time period corresponding to the reference active power output,
   determining an average active power output over the reference time period,
   comparing the average active power output with the reference active power output, and
   in response to the average active power output being less than the reference active power output,
      calculating an average power output deviation, and
      operating the wind turbine at a first set operating point associated with a first active power output, wherein operating at the first set operating point includes:
         calculating a target active power output deviation as a function of the average power output deviation,
         calculating the first active power output as the sum of the reference active power output and the target active power output deviation, and
         controlling the wind turbine such that the active power output is greater than the reference active power output and less than or equal to the first active power output,
   wherein calculating the target active power output deviation as a function of the average power output deviation includes setting the target active power output deviation to be linearly proportional to the average power output deviation.

2. The method according to claim 1, wherein the reference active power output is determined under consideration of at least one of:
   a limitation specification from a grid operator or an energy marketer,
   a curtailment specification from operational control,
   a temperature management of thermally inert generator components,
   an official requirement,
   a nominal output of the wind turbine, and
   a maximum active power of the wind turbine in a specific operating mode.

3. The method according to claim 1, wherein the reference time period is a period of predetermined length up to the current time, wherein the predetermined length is between 1 second and 20 minutes or exactly 10 minutes.

4. The method according to claim 1, wherein the average active power output is a moving average of the active power output that is monitored.

5. The method according to claim 1, further comprising determining a proportionality factor between the target active power output deviation and the average power output deviation under consideration of at least one environmental factor of a construction site of the wind turbine.

6. The method according to claim 1, wherein a predefined maximum target active power output deviation limits an amount of a positive active power output deviation.

7. The method according to claim 1, wherein a predefined proportionality factor for a negative average power output deviation is larger than a predefined proportionality factor for a positive average power output deviation.

8. The method according to claim 1, further comprising:
   in response to the average active power output being greater than the reference active power output, operating the wind turbine at a second operating point specifying that the active power output is less than the reference active power output.

9. A method of operating a wind turbine, the method comprising:
   providing an active power output from the wind turbine to an electric grid,
   monitoring the active power output,
   determining a reference active power output,
   determining a reference time period corresponding to the reference active power output,
   determining an average active power output over the reference time period,
   comparing the average active power output with the reference active power output, and
   in response to the average active power output being less than the reference active power output,
      calculating an average power output deviation, and
      operating the wind turbine at a first set operating point associated with a first active power output, wherein operating at the first set operating point includes:
         calculating a target active power output deviation as a function of the average power output deviation,
         calculating the first active power output as the sum of the reference active power output and the target active power output deviation, and
         controlling the wind turbine such that the active power output is greater than the reference active power output and less than or equal to the first active power output,
   wherein a set active power of the first set operating point is determined according to a power boost factor, the set active power being determined as a product of the reference active power output and the power boost factor, wherein the power boost factor is at least one of:
      a) increased in response to the average active power output being above the reference active power output, and
      b) decreased in response to the average active power output being below the reference active power output,
   wherein the wind turbine includes a rotor comprising at least one rotor blade with an adjustable blade angle, the method further comprising:
      estimating whether the first set operating point will result in a decrease of generated active power by anticipating future power drops, and
      reducing the power boost factor in response to the result of the estimating being positive,
      wherein the anticipating of future power drops includes that increased power generation will reduce a rotor speed of the rotor when the adjustable blade angle of the at least one rotor blade approaches a set minimum pitch angle.

10. The method according to claim 9, further comprising at least one of:
    determining a maximum of the power boost factor proportionally to a deviation of the average active power output from the reference active power output, and
    limiting a change rate of the power boost factor such that oscillations in wind turbine control are avoided.

11. A method of operating a wind turbine, the method comprising:

providing an active power output from the wind turbine to an electric grid,
monitoring the active power output,
determining a reference active power output,
determining a reference time period corresponding to the reference active power output,
determining an average active power output over the reference time period,
comparing the average active power output with the reference active power output, and
in response to the average active power output being less than the reference active power output,
calculating an average power output deviation, and
operating the wind turbine at a first set operating point associated with a first active power output, wherein operating at the first set operating point includes:
calculating a target active power output deviation as a function of the average power output deviation,
calculating the first active power output as the sum of the reference active power output and the target active power output deviation, and
controlling the wind turbine such that the active power output is greater than the reference active power output and less than or equal to the first active power output,
wherein the wind turbine includes a rotor comprising at least one rotor blade with an adjustable blade angle, wherein the operating the wind turbine at the first set operating point includes:
determining a current blade angle of the at least one rotor blade,
determining a minimum blade angle as a minimum value of an operable blade angle range, and
operating the wind turbine at the first set operating point only if the current blade angle exceeds the minimum blade angle plus a predefined difference limit angle.

12. The method according to claim 11, wherein an increase in power above the reference active power output is limited as a function of a difference between the current blade angle and a sum of the limit angle, and the predefined difference angle is limited proportionally to a difference or as a function of a predetermined characteristic curve.

13. The method according to claim 1, comprising stopping the operation of the wind turbine at the first set operating point in response to at least one of:
the average active power output being below the reference active power output due to an intervention of a blade load limiter, an intervention by a storm control operation, or a noise optimization operation.

14. A wind turbine,
wherein the wind turbine is configured to provide an active power output to an electric grid, and
wherein the wind turbine comprises:
a controller configured to:
monitor the active power output,
determine a reference active power output,
determine a reference time period corresponding to the reference active power output,
determine an average active power output over the reference time period,
compare the average active power output with the reference active power output,
in response to the average active power output being less than the reference active power output,
calculate an average power output deviation, and
operate the wind turbine at a first set operating point associated with a first active power output, wherein operating at the first set operating point includes:
calculate a target active power output deviation as a function of the average power output deviation,
calculate the first active power output as the sum of the reference active power output and the target active power output deviation, and
control the wind turbine such that the active power output is greater than the reference active power output and less than or equal to the first active power output,
wherein calculating the target active power output deviation as a function of the average power output deviation includes setting the target active power output deviation to be linearly proportional to the average power output deviation.

15. A method for controlling a wind farm,
wherein the wind farm includes a plurality of wind turbines, and
wherein the method comprises:
providing an active power output from the plurality of wind turbines to an electric grid,
monitoring the active power output,
determining a reference active power output,
determining a reference time period corresponding to the reference active power output,
determining an average active power output over the reference time period,
comparing the average active power output with the reference active power output,
in response to the average active power output being less than the reference active power output,
calculating an average power output deviation, and
operating the plurality of wind turbines at a first set operating point associated with a first active power output, wherein operating at the first set operating point includes:
calculating a target active power output deviation as a function of the average power output deviation,
calculating the first active power output as the sum of the reference active power output and the target active power output deviation, and
controlling the plurality of wind turbines such that the active power output is greater than the reference active power output and less than or equal to the first active power output,
wherein calculating the target active power output deviation as a function of the average power output deviation includes setting the target active power output deviation to be linearly proportional to the average power output deviation.

16. A wind farm controller adapted to control the wind farm according the to a method according to claim 15.

* * * * *